United States Patent
Choi et al.

(10) Patent No.: US 12,026,936 B1
(45) Date of Patent: Jul. 2, 2024

(54) APPARATUS AND METHOD FOR VIDEO REPRESENTATION LEARNING

(71) Applicant: CHUNG ANG University industry Academic Cooperation Foundation, Seoul (KR)

(72) Inventors: Jong Won Choi, Seoul (KR); Soo Hyun Park, Gangwon-do (KR); Jong Su Youn, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/396,142

(22) Filed: Dec. 26, 2023

(30) Foreign Application Priority Data

Jan. 4, 2023 (KR) .................. 10-2023-0001241

(51) Int. Cl.
| | | |
|---|---|---|
| *G06V 10/778* | (2022.01) | |
| *G06V 10/74* | (2022.01) | |
| *G06V 10/774* | (2022.01) | |
| *G06V 10/776* | (2022.01) | |
| *G06V 10/82* | (2022.01) | |
| *G06V 20/40* | (2022.01) | |
| *G10L 25/30* | (2013.01) | |

(52) U.S. Cl.
CPC ........ *G06V 10/7792* (2022.01); *G06V 10/761* (2022.01); *G06V 10/774* (2022.01); *G06V 10/776* (2022.01); *G06V 10/82* (2022.01); *G06V 20/46* (2022.01); *G10L 25/30* (2013.01)

(58) Field of Classification Search
None
See application file for complete search history.

(56) References Cited

U.S. PATENT DOCUMENTS

| | | | | |
|---|---|---|---|---|
| 2020/0364507 | A1* | 11/2020 | Berry | G06F 18/217 |
| 2021/0319321 | A1* | 10/2021 | Krishnamurthy | G06N 20/00 |
| 2021/0319322 | A1 | 10/2021 | Krishnamurthy | |
| 2021/0321172 | A1* | 10/2021 | Krishnamurthy | G06N 3/045 |
| 2022/0343543 | A1 | 10/2022 | Sengupta et al. | |

FOREIGN PATENT DOCUMENTS

KR 10-2015-0091053 A 8/2015

OTHER PUBLICATIONS

Jongsu Yoon et al., "Deep learning-based video exploration using audio-video switch network", Summer Annual Conference of IEIE, 2022, vol. 45, No. 1, pp. 2829-2833 (English translation is also submitted herewith.).

\* cited by examiner

*Primary Examiner* — Leon Flores
(74) *Attorney, Agent, or Firm* — The PL Law Group, PLLC

(57) ABSTRACT

An apparatus for video representation learning according to an embodiment may extract video features from video data to generate a video embedding, extract image features from image data extracted from the video data to generate an image embedding, and extract audio features from audio data extracted from the video data to generate an audio embedding. Further, contrastive learning may be performed by generating a first compositional embedding based on the video embedding and the audio embedding, generating a second compositional embedding based on the video embedding and the audio embedding, generating a positive sample and a negative sample based on a correlation between the image embedding and the audio embedding, and then using the data.

9 Claims, 4 Drawing Sheets

APPARATUS AND METHOD FOR VIDEO REPRESENTATION LEARNING

CROSS-REFERENCE TO RELATED APPLICATION AND CLAIM OF PRIORITY

This application claims the benefit under 35 USC § 119 of Korean Patent Application No. 10-2023-0001241, filed on Jan. 4, 2023, in the Korean Intellectual Property Office, the entire disclosure of which is incorporated herein by reference for all purposes.

BACKGROUND

1. Field

The following description relates to an apparatus and a method for video representation learning, performing multi-model distillation and contrastive learning based on interdependence information of video and audio.

2. Description of Related Art

Existing video search technologies are often dependent on text data or audio data selectively provided, and has problems of requiring a large number of video data for network learning and high costs.

Korean Patent Publication No. 10-2015-0091053 (published on Aug. 7, 2015) discloses a feature in which a user enters a text query related to video to be searched and performs text-based image search based on the entered text query. However, in these text-based methods, there are problems that the quality of input annotations is usually poor, and most annotations only provide a brief description of a portion of video.

SUMMARY

The disclosed embodiments are intended to provide an apparatus and a method for video representation learning, performing multi-model distillation and contrastive learning based on interdependence information of video and audio.

In one general aspect, there is provided an apparatus for video representation learning, the apparatus including a feature extractor including a student network that extracts video features from video data and generates a video embedding, a first teacher network that extracts image features from image data extracted from the video data and generates an image embedding, and a second teacher network that extracts audio features from audio data extracted from the video data and generates an audio embedding, a compositional embedding network unit including a first compositional neural network that generates a first compositional embedding based on the video embedding and the image embedding, and a second compositional neural network that generates a second compositional embedding based on the video embedding and the audio embedding, a sample generator configured to generate positive samples and negative samples based on the image embedding and the audio embedding using a Siamese neural network trained to estimate a correlation between the image embedding and the audio embedding, and a contrastive learning unit configured to generate one or more loss functions for training the student network using the video embedding, the first compositional embedding, the second compositional embedding, the positive samples, and the negative samples.

The student network may be constructed as a three-dimensional convolutional neural network (3D-CNN) by combining a two-dimensional convolutional neural network (2D-CNN) for extracting spatial information with a one-dimensional convolutional neural network (1D-CNN) for extracting temporal information.

The first teacher network may be constructed as a two-dimensional convolutional neural network (2D-CNN) model and generate an image embedding by extracting spatial visual information from the image data, and the second teacher network may be constructed as a one-dimensional convolutional neural network (1D-CNN) model and generate an audio embedding by extracting temporal acoustic information from the audio data.

The first compositional embedding may be calculated by adding the image embedding to an image residual embedding obtained by normalizing each of the image embedding and the video embedding and then concatenating the normalized embeddings, and the second compositional embedding may be calculated by adding the audio embedding to an audio residual embedding obtained by normalizing each of the audio embedding and the video embedding and then concatenating the normalized embeddings.

The Siamese neural network may generate a positive sample by concatenating an image embedding and an audio embedding with a distance according to the correlation that is equal to or shorter than a certain distance, and generate a negative sample by concatenating an image embedding and an audio embedding with the distance according to the correlation that exceeds the certain distance.

The Siamese neural network may be first trained with positive training samples constructed by concatenating an image embedding and an audio embedding with an embedding distance therebetween that is shorter than or equal to a first distance among the image embeddings and audio embeddings and negative training samples constructed by concatenating an image embedding and an audio embedding with the embedding distance therebetween that is equal to or longer than a second distance, and decrease the first distance and increase the second distance as a training order increases.

The contrastive learning unit may be configured to generate a loss function based on cosine similarity of the video embedding and the positive sample and cosine similarity of the video embedding and the negative sample.

In another general aspect, there is provided a method that is performed in a computing device including one or more processors and a memory storing one or more programs executed by the one or more processors, the method including generating a video embedding by extracting a video feature from video data using a student network, generating an image embedding by extracting an image feature from image data extracted from the video data using a first teacher network, generating an audio embedding by extracting an audio feature from audio data extracted from the video data using a second teacher network, generating a first compositional neural network that generates a first compositional embedding based on the video embedding and the image embedding and a second compositional neural network that generates a second compositional embedding based on the video embedding and the audio embedding, generating positive samples and negative samples based on the image embedding and the audio embedding using a Siamese neural network trained to estimate a correlation between the image embedding and the audio embedding, and generating one or more loss functions for training the student network using the video embedding, the first compositional embedding, the second compositional embedding, the positive samples, and the negative samples.

In still another general aspect, there is provide a computer program stored in a non-transitory computer readable storage medium, including one or more instructions that, when executed by a computing device having one or more processors, cause the computing device to perform operations of generating a video embedding by extracting a video feature from video data using a student network, generating an image embedding by extracting an image feature from image data extracted from the video data using a first teacher network, generating an audio embedding by extracting an audio feature from audio data extracted from the video data using a second teacher network, generating a first compositional neural network that generates a first compositional embedding based on the video embedding and the image embedding and a second compositional neural network that generates a second compositional embedding based on the video embedding and the audio embedding, generating positive samples and negative samples based on the image embedding and the audio embedding using a Siamese neural network trained to estimate a correlation between the image embedding and the audio embedding, and generating one or more loss functions for training the student network using the video embedding, the first compositional embedding, the second compositional embedding, the positive samples, and the negative samples.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice, the intention of a user or operator, or the like. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

Figure 1:
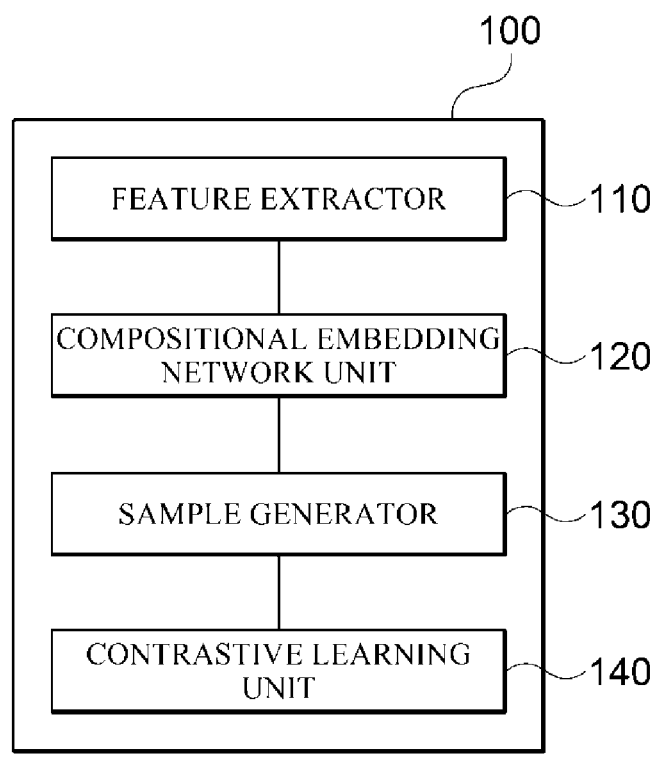
FIG. 1 is a configuration diagram of an apparatus for video representation learning according to one embodiment.

FIG. 1 is a configuration diagram of an apparatus for video representation learning according to one embodiment.

According to one embodiment, an apparatus for video representation learning 100 may include a feature extractor 110, a compositional embedding network unit 120, a sample generator 130, and a contrastive learning unit 140.

According to one embodiment, the feature extractor 110 may include a student network that extracts video features from video data and generates a video embedding, a first teacher network that extracts image features from image data extracted from the video data and generates an image embedding, and a second teacher network that extracts audio features from audio data extracted from the video data and generates an audio embedding.

For example, the two teacher network models (visual, audio) have already been trained and no separate additional training is required. That is, the two teacher networks may be used to extract meaningful image and audio feature information as a pre-learning model. On the other hand, the student network may learn through contrastive learning and knowledge distillation based on data acquired through the teacher networks.

Figure 2:
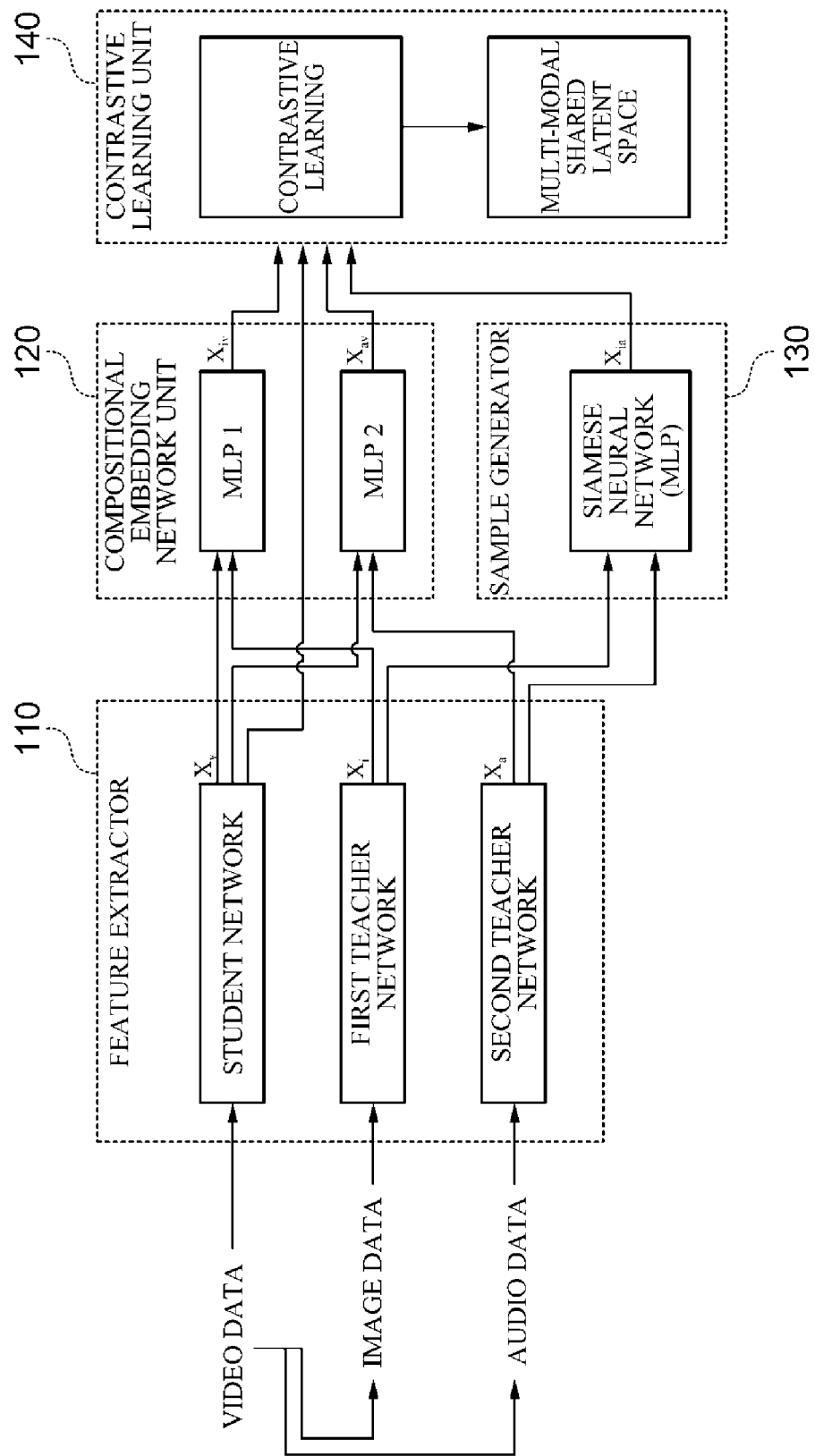
FIG. 2 is an exemplary diagram for describing a configuration of the apparatus for video representation learning according to one embodiment.

According to one embodiment, the student network may be constructed as a three-dimensional convolutional neural network (3D-CNN) by combining a two-dimensional convolutional neural network (2D-CNN) for extracting spatial information with a one-dimensional convolutional neural network (1D-CNN) for extracting temporal information. For example, the student network may include residual blocks with (2+1)D convolutions that encode spatiotemporal visual content by alternating 2D spatial convolutions with 1D temporal convolutions. Here, the student network may be a network with relatively few parameters compared to the two teacher networks that extract image and audio features. Referring to FIG. 2, the student network may generate a video embedding $X_v$ and transmit it to the compositional embedding network unit 120, the sample generator 130, and the contrastive learning unit 140.

According to one embodiment, the first teacher network may be constructed as a two-dimensional convolutional neural network (2D-CNN) model, and generate an image embedding by extracting spatial visual information from image data. Referring to FIG. 2, the first teacher network may generate an image embedding $X_i$ and transmit it to the compositional embedding network unit 120 and the sample generator 130.

As one example, the first teacher network may be a model pre-trained with ImageNet data set, and an image feature may be extracted. The first teacher network is a 2D-CNN-based model, and may extract spatial visual information. For example, since each video clip contains a set of image frames, the first teacher network may randomly select only one image frame at a time to represent spatial visual content. By extracting image frames from video and extracting image key information using the first teacher network trained with a large data set, the student network may generate an image embedding containing important information about the image with a small parameter model in a learning stage.

According to one embodiment, the second teacher network may be constructed as a one-dimensional convolutional neural network (1D-CNN) model, and generate an audio embedding by extracting temporal acoustic information from audio data. Referring to FIG. 2, the second teacher network may generate an audio embedding $x_a$ and transmit it to the compositional embedding network unit 120 and the sample generator 130.

As one example, the images and audio content of a video may not be semantically related, but audio knowledge contains temporal information that provides rich information. For example, given an audio recording of a video, a log mel spectrogram may be extracted to obtain an audio embedding through the second teacher network. The second teacher network, which is constructed as the 1D-CNN, is a network pre-trained with the AudioSet data set to capture temporal acoustic information.

Referring to FIG. 2, the compositional embedding network unit 120 may include a first compositional neural network that generates a first compositional embedding $x_{iv}$ based on the video embedding and the image embedding, and a second compositional neural network that generates a second compositional embedding $x_{av}$ based on the video embedding and the audio embedding.

As one example, the compositional embedding network unit 120 has to reduce a semantic gap and a domain gap between the teacher network and the student network to apply multi-modal distillation to contrastive learning, and for this purpose, generates $x_{iv}$ (video+image) and $x_{av}$ (video+audio) for contrastive learning using the compositional embedding through a simple multi-layer perceptron (MLP) network.

According to one embodiment, the first compositional embedding may be calculated by adding the image embedding to an image residual embedding obtained by normalizing each of the image embedding and the video embedding and then concatenating the normalized embeddings, and the second compositional embedding may be calculated by adding the audio embedding to an audio residual embedding obtained by normalizing each of the audio embedding and the video embedding and then concatenating the normalized embeddings.

As one example, the two compositional neural networks are networks for bridging the semantic gap and domain gap between the teacher network and the student network for contrastive learning and multi-modal knowledge distillation. For example, when video data is analyzed, some videos have a correlation between videos and images, and videos and audio, while others do not. To solve this problem, a composition function $F(\cdot,\cdot)$ may be defined as shown in the equation below.

$$F_{av}(x_a,x_v)=x_{av}=x_a+f_{\theta_{av}}(x_a,x_v)$$

$$F_{iv}(x_i,x_v)=x_{iv}=x_i+f_{\theta_{iv}}(x_i,x_v) \quad \text{[Equation 1]}$$

Here, the composition function is constructed as a linear projection in a manner in which a residual $f_{\theta_{av}}$ obtained by combining the two embeddings through normalization and concatenation is added. The function may be optimized through cross-entropy-based classification loss learning using label information.

According to one embodiment, the sample generator 130 may generate positive samples and negative samples based on the image embedding and the audio embedding using a Siamese neural network trained to estimate a correlation between the image embedding and the audio embedding. Referring to FIG. 2, the generated positive and negative samples $x_{ia}$ may be transmitted to the contrastive learning unit 140.

As one example, the sample generator 130 may receive image and audio feature information extracted from the pre-learning model. For example, the sample generator 130 may include MLP-based Siamese neural networks. The sample generator 130 may be trained using triplet loss, which defines an image and audio from the same class video as positive and the rest as negative, using class label information. Through the training, the sample generator 130 may additionally generate positive samples and negative samples for contrastive learning based on the image-audio mutual information relationship based on a feature embedding distance.

According to one embodiment, the Siamese neural network may be trained so that an image embedding and an audio embedding from video data of the same frame are closer to each other and the rest are farther away from each other, and may be constructed so that, among the input image embeddings and audio embeddings, an image embedding and an audio embedding with a high correlation are closer to each other, and an image embedding and an audio embedding with a low correlation are farther away from each other.

In general, contrastive learning tends to perform better when the quality of positive samples and negative samples is good and there are more data. Most contrastive learning methods in the related art solve this problem by learning a huge amount of video data or using a memory bank method. In this case, the size of the training data increases and the model becomes more complex, which has disadvantages in terms of cost and efficiency.

In the case of methods in the related art, samples randomly extracted from negative samples are used, and there are cases where the samples determined as negative are actually similar, which may lead to a problem of performance deterioration through learning. In addition, compared to negative samples, positive samples tend to be relatively small in number, which has a significant impact on the performance of contrastive learning. On the other hand, the sample generator 130 may generate new positive and negative samples capable of effectively representing video through a neural network.

According to one example, the sample generator 130 may receive embedding vectors generated from two teacher networks. Since an image embedding and an audio embedding have different distributions, directly utilizing them has a negative impact on performance. In order to solve this problem, the sample generator 130 may include an MLP model-based Siamese neural network.

As one example, the Siamese neural network is trained to utilize class label information in data so that an image embedding and an audio embedding from the same video are closer to each other and the rest are farther away from each other. Triplet loss for this may be expressed as the equation below.

$$\sum_{i}^{N}\left[\|f(x_i^a) - f(x_i^p)\|_2^2 - \|f(x_i^a) - f(x_i^n)\|_2^2 + \alpha\right] \quad \text{[Equation 2]}$$

Here, $f(x_i^a)$(anchor) and $f(x_i^p)$(positive) may be learned to be closer in an embedding space, and $f(x_i^a)$(anchor) and $f(x_i^n)$(negative) may be learned to be farther away from each other. Here, a is a hyperparameter for sending the negative sample farther.

According to one embodiment, the sample generator 130 may generate a positive sample by concatenating the image embedding and the audio embedding generated to be closer to each other with the high correlation, and generate a negative sample by concatenating the image embedding and the audio embedding generated to be farther away from each other with the low correlation. For example, the sample generator 130 may use new features obtained through the Siamese neural network to generate additional positive samples with a high correlation between images and audio with less video data and generate more negative samples without separate augmentation.

According to one embodiment, the Siamese neural network may be first trained with positive training samples constructed by concatenating an image embedding and an audio embedding with an embedding distance therebetween that is shorter than or equal to a first distance among the image embeddings and audio embeddings and negative training samples constructed by concatenating an image embedding and an audio embedding with the embedding distance therebetween that is equal to or longer than a second distance, and decrease the first distance and increase the second distance as a training order increases.

According to one example, the sample generator 130 may generate positive samples and negative samples using a curriculum learning method. For example, the sample generator 130 may sample K closest embeddings as positive samples according to the embedding distance of the image embedding and the audio embedding, and sample the rest as negative samples. Then, the sample generator 130 may primarily generate negative samples with large differences in audio and image interdependence information and positive samples with small differences. In general, during contrastive learning, when the network is initially optimized using only easy negative samples with large differences in interdependence information for initial learning and then hard negative samples with small differences in interdependence information are applied, performance may be improved in downstream tasks such as video search.

To this end, the sample generator 130 may train the Siamese neural network by applying a curriculum learning method of training using easy samples and then training using increasingly difficult samples.

For example, as the Siamese neural network learns using the triplet loss, positive samples between images and audio become closer and negative samples move further away, and thus gradually high-difficulty positive and negative samples are generated. These newly generated samples may be used for contrastive learning.

According to one embodiment, the contrastive learning unit 140 may generate one or more loss functions for training the student network using the video embedding, the first compositional embedding, the second compositional embedding, the positive samples, and the negative samples.

The ultimate goal of the apparatus for video representation learning according to one embodiment is to train a student neural network for video search. To this end, the student network may be trained using the embedding information defined above in a space defined as a multi-modal shared latent space.

For example, contrastive learning and knowledge distillation may be performed using a corresponding loss such as multi-class NCE loss with the embedding vectors obtained from the compositional embedding network unit 120 and the vectors obtained for knowledge distillation of the two teacher networks, multi-instance InfoNCE loss, which is a contrastive learning loss applying positive samples and negative samples newly obtained through the sample generator 130, JSD loss for reducing feature distribution between newly obtained samples and the student network, or the like.

According to one embodiment, the contrastive learning unit 140 may generate a loss function based on cosine similarity of the video embedding and the positive sample and cosine similarity of the video embedding and the negative sample.

As one example, the contrastive learning unit 140 may perform contrastive learning using the samples generated in the feature extractor 110 and the new positive samples and negative samples generated in the sample generator 130. For example, the contrastive learning may be performed by using sequences of existing videos to construct new positive and negative samples corresponding to features from the student network, and then making them close to positive samples with good features and high video and audio mutual information extracted from the teacher networks, rather than using positive samples defined in the same class (label) by the student network, which is the previous method.

This may have the effect of increasing the performance of the student network through knowledge distillation of the teacher networks. For example, contrast loss for contrastive learning may be expressed as the equation below.

$$L_{cs} = -\log \frac{\sum_{p \in P_i} \exp\left(\frac{\Phi(x_{v(i)}, x_{ia(p)})}{\tau}\right)}{\sum_{p \in P_i} \exp\left(\frac{\Phi(x_{v(i)}, x_{ia(p)})}{\tau}\right) + \sum_{n \in N_i} \exp\left(\frac{\Phi(x_{v(i)}, x_{ia(n)})}{\tau}\right)}$$

[Equation 3]

Here, $P_i$ and $N_i$ represent new positive and negative samples, $\Phi$ refers to a cosine similarity score function, and $\tau$ refers to temperature.

According to one example, the student network may be trained through multi-modal distillation. For example, using class label information in the dataset, positive and negative may be defined and the multi-class NCE loss may be used. NCE loss, which is a contrastive learning loss, may be used to ensure that a higher probability is assigned when positive for the feature of the student network with the image and audio features of the teacher networks and a lower probability is assigned when negative. For example, the multi-class NCE loss may be expressed as the equation below.

$$L_a(x_v, x_a, x_{av}) = \lambda L_{\eta_{ce}}(x_v, x_a) + (1-\lambda)L_{\eta_{ce}}(x_v, x_{av})$$

$$L_i(x_v, x_i, x_{iv}) = \lambda L_{\eta_{ce}}(x_v, x_i) + (1-\lambda)L_{\eta_{ce}}(x_v, x_{iv})$$

[Equation 4]

According to one example, for a feature embedding value from the feature extractor 110 and newly generated embedding value from the sample generator 130, there is a possibility that a semantic difference exists between the two distributions. Accordingly, a loss that reduces the difference between probability distributions may be applied using Jensen-Shannon Divergence, which reduces the difference between two data distributions, as shown in the equation below.

$$L_{JSD} = JSD(P_v \| P_{av}) = \frac{(KL(P_v \| P_{av}) + KL(P_{av} \| P_v))}{2}$$

[Equation 5]

$$L_{JSD} = JSD(P_v \| P_{iv}) = \frac{(KL(P_v \| P_{iv}) + KL(P_{iv} \| P_v))}{2}$$

According to one example, a final loss function for training the student network may be defined as the equation below by adding $L_{distill}$ for multi-modal distillation using compositional embeddings and embeddings obtained from teacher networks, $L_{cs}$, which is a multi-class instance NCE loss using new positive and negative samples obtained from the sample generator 130, $L_{JSD}$ that reduces the difference between the two distributions, and $L_{triplet}$ loss for training the Siamese neural network present in the sample generator 130.

$$L_{total} = L_{distill} + L_{cs} + L_{JSD} + L_{triplet} \quad \text{[Equation 6]}$$

Here, $L_{distill}$ represents a combined loss of $L_a$ and $L_i$, $L_{triplet}$ represents the triplet loss of Equation 2, and $L_{JSD}$ represents the sum of the $L_{JSD}$ losses for $P_{av}$ and $P_{iv}$ in Equation 5.

Figure 3:
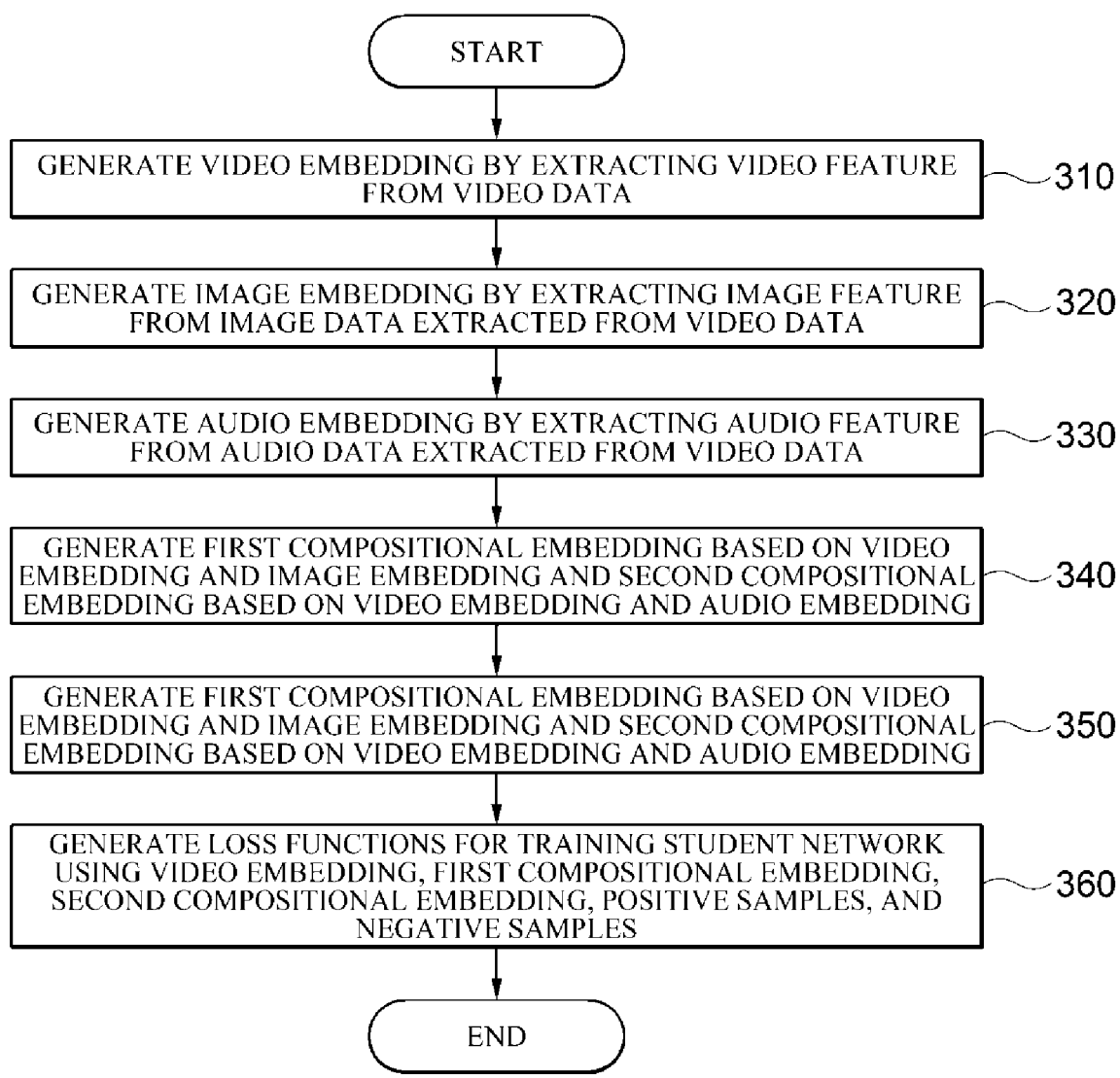
FIG. 3 is a flowchart showing a method for video representation learning according to one embodiment.

FIG. 3 is a flowchart showing a method for video representation learning according to one embodiment.

According to one embodiment, the apparatus for video representation learning may generate a video embedding by extracting a video feature from video data using a student network (310), generate an image embedding by extracting an image feature from image data extracted from the video data using a first teacher network (320), and generate an audio embedding by extracting an audio feature from audio data extracted from the video data using a second teacher network (330).

For example, the two teacher network models (visual, audio) have already been trained and no separate additional training is required. That is, the two teacher networks may be used to extract meaningful image and audio feature information as a pre-learning model. On the other hand, the student network may learn through contrastive learning and knowledge distillation based on data acquired through the teacher networks.

According to one embodiment, the apparatus for video representation learning may generate a first compositional neural network that generates a first compositional embedding based on the video embedding and the image embedding and a second compositional neural network that generates a second compositional embedding based on the video embedding and the audio embedding (340).

As one example, the apparatus for video representation learning has to reduce a semantic gap and a domain gap between the teacher network and the student network to apply multi-modal distillation to contrastive learning, and for this purpose, may generate $x_{iv}$ (video+image) and $x_{av}$ (video+audio) for contrastive learning using the compositional embedding through a simple multi-layer perceptron (MLP) network.

According to one embodiment, the apparatus for video representation learning may generate positive samples and negative samples based on the image embedding and the audio embedding using a Siamese neural network trained to estimate a correlation between the image embedding and the audio embedding (350).

As one example, the apparatus for video representation learning may include an MLP-based Siamese Neural Network. Using the MLP-based Siamese Neural Network, the apparatus for video representation learning may additionally generate positive samples and negative samples for contrastive learning based on the image-audio mutual information relationship based on a feature embedding distance.

According to one embodiment, the apparatus for video representation learning may generate one or more loss functions for training the student network using the video embedding, the first compositional embedding, the second compositional embedding, the positive samples, and the negative samples (360).

In the embodiment of FIG. 3, the same aspects as FIGS. 1 and 2 will not be redundantly described.

Figure 4:
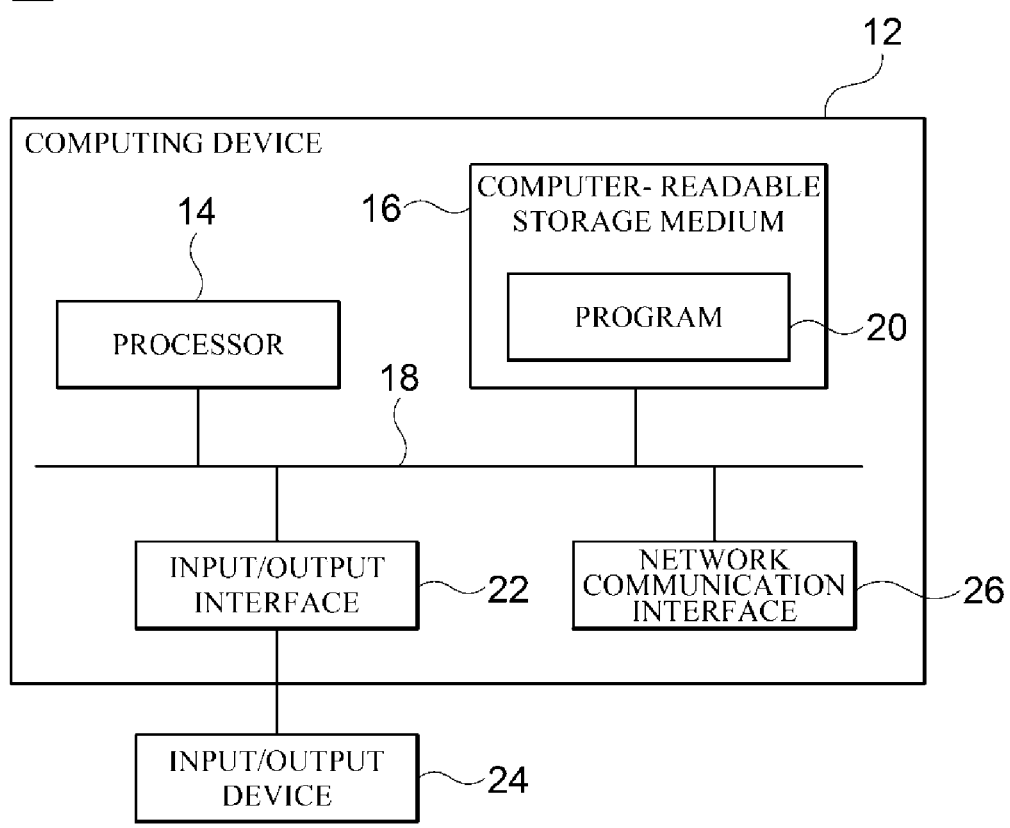
FIG. 4 is a block diagram exemplarily illustrating a computing environment that includes a computing device suitable for use in exemplary embodiments.

FIG. 4 is a block diagram exemplarily illustrating a computing environment 10 that includes a computing device suitable for use in exemplary embodiments. In the illustrated embodiment, each component may have a different function and capability in addition to those described below, and additional components may be included in addition to those described below.

The illustrated computing environment 10 includes a computing device 12. In one embodiment, the computing device 12 may be the apparatus for video representation learning.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In one embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as one of components constituting the computing device 12, or may be connected to the computing device 12 as a separate device distinct from the computing device 12.

An apparatus and a method for video representation learning, performing multi-model distillation and contrastive learning based on interdependence information of video and audio, are provided.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. An apparatus for video representation learning, the apparatus comprising:
   a feature extractor including a student network configured to extract video features from video data and generate a video embedding, a first teacher network configured to extract image features from image data extracted from the video data and generate an image embedding, and a second teacher network configured to extract audio features from audio data extracted from the video data and generate an audio embedding;
   a compositional embedding network unit including a first compositional neural network configured to generate a first compositional embedding based on the video embedding and the image embedding, and a second compositional neural network configured to generate a second compositional embedding based on the video embedding and the audio embedding;
   a sample generator configured to generate positive samples and negative samples based on the image embedding and the audio embedding using a Siamese neural network trained to estimate a correlation between the image embedding and the audio embedding; and
   a contrastive learning unit configured to generate one or more loss functions for training the student network using the video embedding, the first compositional embedding, the second compositional embedding, the positive samples, and the negative samples.

2. The apparatus of claim 1, wherein the student network is constructed as a three-dimensional convolutional neural network (3D-CNN) by combining a two-dimensional convolutional neural network (2D-CNN) for extracting spatial information with a one-dimensional convolutional neural network (1D-CNN) for extracting temporal information.

3. The apparatus of claim 1, wherein the first teacher network is constructed as a two-dimensional convolutional neural network (2D-CNN) model, and generates an image embedding by extracting spatial visual information from the image data, and
   the second teacher network is constructed as a one-dimensional convolutional neural network (1D-CNN) model, and generates an audio embedding by extracting temporal acoustic information from the audio data.

4. The apparatus of claim 1, wherein the first compositional embedding is calculated by adding the image embedding to an image residual embedding obtained by normalizing each of the image embedding and the video embedding and then concatenating the normalized embeddings, and
   the second compositional embedding is calculated by adding the audio embedding to an audio residual embedding obtained by normalizing each of the audio embedding and the video embedding and then concatenating the normalized embeddings.

5. The apparatus of claim 1, wherein the Siamese neural network generates a positive sample by concatenating an image embedding and an audio embedding with a distance according to the correlation that is equal to or shorter than a certain distance, and generates a negative sample by concatenating an image embedding and an audio embedding with the distance according to the correlation that exceeds the certain distance.

6. The apparatus of claim 5, wherein the Siamese neural network is first trained with positive training samples constructed by concatenating an image embedding and an audio embedding with an embedding distance therebetween that is shorter than or equal to a first distance among the image embeddings and audio embeddings and negative training samples constructed by concatenating an image embedding and an audio embedding with the embedding distance therebetween that is equal to or longer than a second distance, and decreases the first distance and increases the second distance as a training order increases.

7. The apparatus of claim 1, wherein the contrastive learning unit is configured to generate a loss function based on cosine similarity of the video embedding and the positive sample and cosine similarity of the video embedding and the negative sample.

8. A method performed in a computing device including one or more processors and a memory storing one or more programs executed by the one or more processors, the method comprising:
   generating a video embedding by extracting a video feature from video data using a student network;
   generating an image embedding by extracting an image feature from image data extracted from the video data using a first teacher network;
   generating an audio embedding by extracting an audio feature from audio data extracted from the video data using a second teacher network;
   generating a first compositional neural network that generates a first compositional embedding based on the video embedding and the image embedding and a second compositional neural network that generates a second compositional embedding based on the video embedding and the audio embedding;
   generating positive samples and negative samples based on the image embedding and the audio embedding using a Siamese neural network trained to estimate a correlation between the image embedding and the audio embedding; and
   generating one or more loss functions for training the student network using the video embedding, the first compositional embedding, the second compositional embedding, the positive samples, and the negative samples.

9. A computer program stored in a non-transitory computer readable storage medium, the computer program comprising one or more instructions that, when executed by a computing device having one or more processors, cause the computing device to perform operations of:
   generating a video embedding by extracting a video feature from video data using a student network;
   generating an image embedding by extracting an image feature from image data extracted from the video data using a first teacher network;
   generating an audio embedding by extracting an audio feature from audio data extracted from the video data using a second teacher network;
   generating a first compositional neural network that generates a first compositional embedding based on the video embedding and the image embedding and a second compositional neural network that generates a second compositional embedding based on the video embedding and the audio embedding;

generating positive samples and negative samples based on the image embedding and the audio embedding using a Siamese neural network trained to estimate a correlation between the image embedding and the audio embedding; and generating one or more loss functions for training the student network using the video embedding, the first compositional embedding, the second compositional embedding, the positive samples, and the negative samples.

* * * * *